United States Patent [19]

Nicolas et al.

[11] Patent Number: 4,606,039

[45] Date of Patent: Aug. 12, 1986

[54] SPREAD SPECTRUM CODING METHOD AND APPARATUS

[75] Inventors: Michel J. R. Nicolas, Paris; Bruno R. Sebilet, Suresnes, both of France

[73] Assignee: Societe Nationale d'Etudes et de Construction de Moteurs d'Aviation S.N.E.C.M.A., Paris, France

[21] Appl. No.: 629,510

[22] Filed: Jul. 10, 1984

[30] Foreign Application Priority Data

Jul. 21, 1983 [FR] France .................. 83 12043

[51] Int. Cl.⁴ .................. H04L 9/02; H04B 15/00
[52] U.S. Cl. ...................... 375/1; 375/96; 375/115; 364/717; 178/22.14
[58] Field of Search .......... 375/1, 2.1, 2.2, 96, 375/111, 114, 115; 370/18, 19, 21; 364/717, 728; 178/22.01, 22.1, 22.14; 367/39; 343/5 PN; 331/78

[56] References Cited

U.S. PATENT DOCUMENTS

| 4,308,617 | 12/1981 | German, Jr. ............ 375/1 |
| 4,320,513 | 3/1982 | Lampert ............... 364/717 |
| 4,341,925 | 7/1982 | Frosch ................ 364/717 |
| 4,450,321 | 5/1984 | Quigley et al. ........ 178/22.14 |

FOREIGN PATENT DOCUMENTS 1549067 1/1971 Fed. Rep. of Germany.
2111732 7/1983 United Kingdom.

OTHER PUBLICATIONS

R. C. Dixon (1976), "Spread Spectrum Systems," pp. 13-191.
IEE Proceedings-F, vol. 128, No. 5 (Oct. 1981), M. S. Shipton et al, "Improvements in Use of Contested Spectrum for Land Mobile Radio Service by Adoption of Bandsharing Spread-Spectrum System with TV Broadcast Channels," pp. 245-260.

Primary Examiner—Benedict V. Safourek
Attorney, Agent, or Firm—Oblon, Fisher, Spivak, McClelland & Maier

[57] ABSTRACT

In a process for coding of radio transmissions by spectrum spreading, a signal is phase modulated by means of a 0-pi modulator controlled by a psuedo random sequence formed by combining in accordance with a logical majority function an odd number of elementary codes constituted by pseudo random binary sequences of different lengths. On reception, the synchronization of the code which controls the demodulator is realized by correlating each of the elementary codes with the received signal.

7 Claims, 2 Drawing Figures

SPREAD SPECTRUM CODING METHOD AND APPARATUS

BACKGROUND OF THE INVENTION

1. Field of the Invention

The present invention relates to a process for spread spectrum coding and decoding a transmission, of the type in which a signal to be transmitted is phase modulated by a O-pi modulator controlled by a code formed of a sequence of binary values and the received signal is phase demodulated by means of a O-pi demodulator controlled by the same code. The code used at the receiver reception being synchronised with that used during transmission by correlating the receiver code with the received signal.

2. Summary of the Prior Art

In order to reduce the effect of jamming on transmitted signals and the risk of an intercepted signal being deciphered, it has been known to code the signal such that it covers a larger spectral spread. In such a process the spectral spread is realised by modulating, by means of a O-pi modulator, the signal by a code the spectrum of which is most important. On reception, the code used to control the demodulator is synchronised with the transmitter code by correlation with the received signal. That is delay means are used to progressively shift the code with reference to the received signal until a correlation peak is detected.

It is also clear that in order to be effective, the code must be long. Nevertheless, when the code used is lengthened the synchronisation operation on reception takes longer and quickly becomes prohibitive.

SUMMARY OF THE INVENTION

The object of the present invention is to provide a process of the type described which retains the advantages obtained by the utilisation of a long code while permitting a rapid synchronisation of the code at the receiver end.

This object is achieved, in accordance with the invention, by a process for coding and decoding a signal for a spread spectrum transmission, including the steps of phase modulating the signal by means of a O-pi modulator controlled by a code formed from a sequence of binary values generating the code to control the modulator by combining in accordance with a logical majority function an odd number of elementary codes formed from pseudo random binary sequences including different numbers of bits transmitting the modulated signal, receiving the transmitted signal, phase demodulating the received signal by means of a O-pi demodulator controlled by the same code as used in the transmitter, generating in the receiver the code to control the demodulator from the same elementary codes as used in the transmitter, and synchronising the code used in the receiver with that used for transmission by correlating each of the elementary codes with the received signal.

The use of elementary codes of different lengths and, preferably, of co-prime numbers of bits allows the advantages of long codes to be retained, that is to say the protection against deciphering, the uniform spreading of the power in the frequency band used and an increase in complex treatment, which provides good protection against interference. To these advantages is added the possibility of carrying out the synchronisation operation on reception in a very short time since it is carried out on the elementary codes. Accordingly as the correlation of the elementary codes with the received signal is carried out in parallel or serially, the length of the synchronisation operation is either the time necessary for the correlation of the longest elementary code or the sum of the periods necessary for the synchronisation of the different elementary codes. Even in the latter case, the duration of the synchronisation operation is negligible compared with that which would be necessary for correlating the final code with the received signal.

The present invention also relates to apparatus for implementing this process in a communications system.

The invention accordingly provides apparatus for coding and decoding a signal for spread spectrum transmission in a communications system including a transmitter and at least one receiver, the transmitter including a O-pi phase modulator for receiving the signal to be transmitted and producing a coded signal, a first code generator for generating a code which is a sequence of binary values, and means for applying said code to said control phase modulator, each receiver including a O-pi phase demodulator for decoding the received coded signal, a second code generator, each of said first and second code generators including an odd plurality of elementary code generators each having an output and each adapted to generate an elementary code formed of a pseudo random binary sequence containing a respective different number of bits, a control circuit for each said elementary generator, and a combining circuit connected to said outputs of said elementary generators and delivering said code which is formed by applying a logical majority function to the input bits of the elementary codes, the or each receiver further including means for applying the code generated by said second code generator to control said phase demodulator, and correlation means having a first input for receiving said received coded signal and, a second input for receiving each of the elementary codes generated by said elementary generators of said second code generator and outputting a signal at the correlation peak of the inputs, said control circuit of said elementary generators of said second code generator including synchronisation means acting in response to said output signals provided by said correlation means for synchronising each of said elementary generators independently of the others.

DESCRIPTION OF THE PREFERRED EMBODIMENTS

Figure 1:
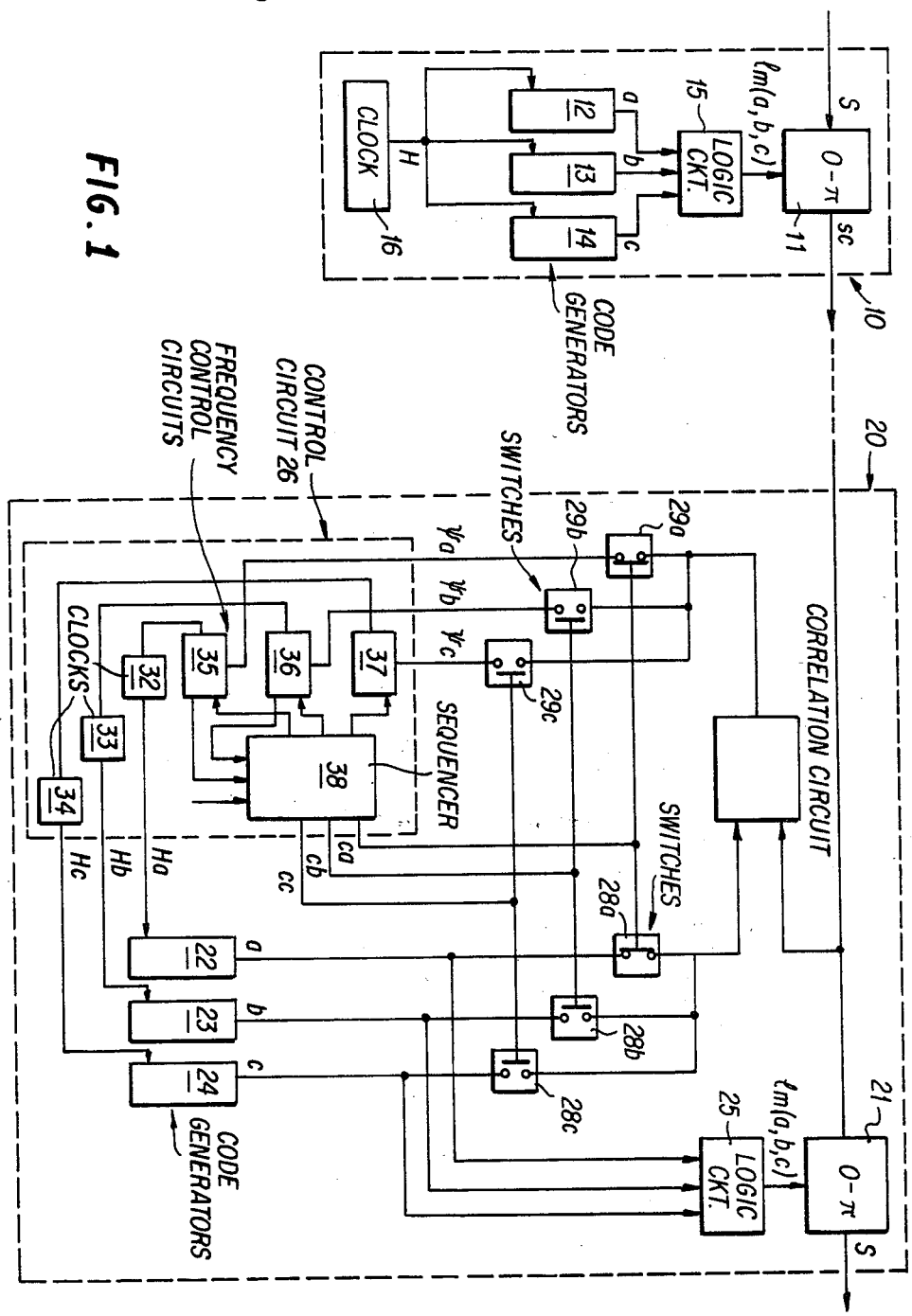
FIG. 1 is a diagram showing a first embodiment of apparatus in accordance with the invention.

The communications system represented in FIG. 1 comprises a transmitter 10 and at least one receiver 20. The path between the transmitter and receiver being defined by a radio link established by means of antennas (not shown).

The transmitter 10 receives a signal S to be coded and transmitted. The coding is realised in a manner known per se, by means of a O-pi phase modulator which outputs the coded signal SC and which is controlled by a code formed by a sequence of bits, the phase of the signal being inverted or not according to the value of each bit of the code which is presented and to the rate of presentation of these bits.

In accordance with the invention, the code applied to the phase modulator 11 is a composite code formed by the combining in accordance with a logical majority function of an odd number of elementary codes. In the example illustrated, there are three elementary codes but any odd number of codes could also be used. The different codes a,b,c are produced by the code generators 12, 13,14 respectively and are formed by pseudo random sequences of bits. The numbers na,nb,nc of bits forming the codes a,b and c are different and preferably co-prime. The combining of the codes in accordance with the logical majority function is carried out by a logic circuit 15 which receives the codes a,b,c produced by the generators 12,13 and 14 and which derives the value of the logical function a.b+b.c+a.c. This function gives a bit having the same logic value as the majority of bits presented to it. The generators 12,13,14 are controlled in synchronism by a clock 16 which produces a signal H which has a pulse frequency F which determines the output rate of successive bits of each code. The generators 12,13,14, comprise for example shift registers tied to each other and controlled by the signal H. For each group of three bits which are presented simultaneously, the logic circuit 15 provides a bit of value (0 or 1) which is equal to the majority value in this group. At the output of circuit 15 a code is produced which may be composed of or represented at lm (a,b,c) and of which successive bits are presented at frequency F and the length of which is equal to the lowest common multiple of na,nb and nc, that is to say na×nb×nc if the numbers are coprime. One may consider that the gain produced by the described process of code generation is comparable to the least common multiple relative to the sum of the numbers na,nb and nc. The gain is therefore maximum when the numbers are co-prime.

The coded signal SC is demodulated in the receiver 20 by passing it through a O-pi phase demodulator 21 controlled by an identical code to that used in the transmitter in order to restore the original signal S at the output of the demodulator 21. The synchronisation of the code used in the receiver with that used in the transmitter is effected by correlation with the received signal.

The code provided by the demodulator 21 is created by means of a logical circuit 25 identical to circuit 15, which carries out the logical majority function to combine the three codes a,b,c, provided by the generators 22,23,24, identical to the generators 12,13,14 and controlled by respective clock signals Ha,Hb,Hc. These clock signals are output by respective clocks 32,33,34 of a control circuit 26.

The synchronisation of the receiver code 21 with that of the transmitter is effected by correlating each code a,b,c with the received coded signal SC. In the embodiment of FIG. 1, the correlations of codes A,B,C with the signal SC are serially carried out in a single correlation circuit 27 of which one input receives the signal SC and of which the other input is connected in sequence to generators 22,23,24 by means of respective switches 28a,28b,28c. In response to the detection of a correlation peak, the circuit 27 provides a signal on its output which is connected to a respective one of the three inputs of circuit 26 by the means of respective switches 29a,29b,29c. Each code generator 22,23,24 is synchronised to the received coded signal SC and the output of the correlator 27 controls the delay with which the local code is output with reference to the received signal. This is realised by accelerating or slowing down the clock associated with each code generator, the synchronisation being realised by slaving the local code to the received signal. For this purpose, each clock, 32,33,34 delivers its signal Ha,Hb, and Hc with a variable frequency under the control of signals SHa,SHb and SHc produced by the frequency control circuits 35,36, and 37. The latter circuits have their inputs connected respectively to switches 29a,29b and 29c.

The synchronisation of a code generator, for example 22, is effected as follows. The switches 28a and 29a are closed and the other switches 28b,28c,29b and 29c are open, the different pairs of switches 28a-29a, 28b-29b and 28c-29c being controlled by the signals ca,cb,cc produced by a sequencing circuit 38. The frequency of the clock 32 is varied by means of circuit 35 until detection by this circuit of a signal A from circuit 27 and indicating the presence of a correlation peak, which detection causes the locking of the frequency of the clock 32. Then, the switches 28a,29a are opened and the switches 28b,29b are closed for carrying out in the same manner the synchronisation of the clock 33 and of the generator 23 in response to a signal ØB indicating a new correlation peak. Finally, the switches 28b,29b are opened and the switches 28c,29c are closed in order to carry out the synchronisation of the clock 34 and of generator 24 in response to a signal ØC indicating a new correlation peak. The synchronisation of generators 22,23,24 being then completed, the decoding proper may commence. It will be noted that the sequencer 38 produces the signals applied to the circuits 35,36,37 for releasing the synchronisation phases of generators 22,23,24 in response to an external command and to the received signals of circuits 36,37, indicating that the generators 22 and 23 have been synchronised.

Figure 2:
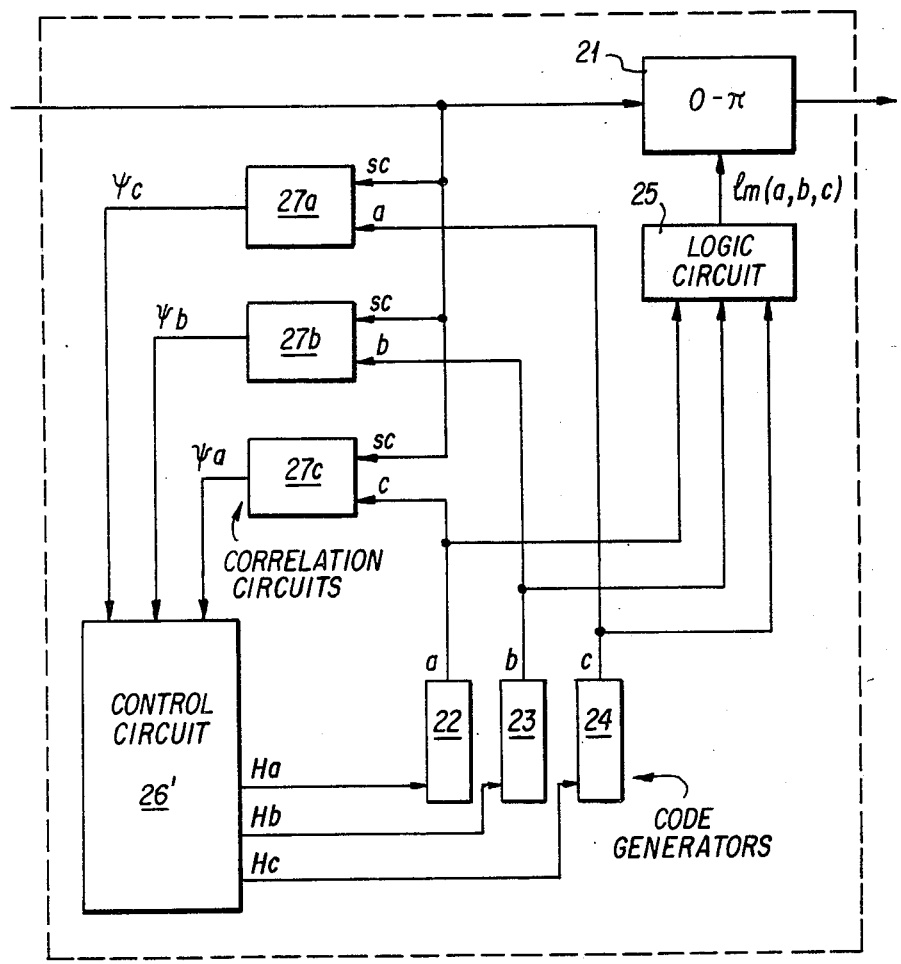
FIG. 2 is a diagram of the receiver of a second embodiment of apparatus in accordance with the invention.

FIG. 2 illustrates another embodiment of the receiver, the elements identical to those illustrated in FIG. 1 carry the same reference numerals. In this other embodiment, the synchronisation of generators 22,23,24 is carried out in parallel instead of serially. For this purpose three correlation circuits 27a,27b,27c are provided which receive the signal SC on a first input and are connected by their second inputs respectively to generators 22,23,24. A control circuit 26' receives the signals ØA, ØB and ØC of the correlation circuits 27a,27b,27c and produces in response the clock signals Ha,Hb,Hc for the generators 22,23,24.

As already indicated, the invention is particularly advantageous in that it permits the alliance of the advantages of a long code with those of a rapid synchronisation of the code on reception. In order to ensure that the correlation peaks are of sufficient amplitude for ready detection, it is desirable to limit the number of elementary codes used. This does not represent an inconvenient limitation since composite codes of several millions or tens of millions of bits can be obtained from three short elementary codes with only hundreds or several thousands of bits which only require a restricted time for synchronisation at the receiver.

We claim:

1. A process for coding and decoding an input signal for a spread spectrum transmission, including the steps of phase modulating said input signal by means of a O-pi modulator controlled by a code formed from a sequence of binary values generating the code to control the modulator by combining in accordance with a logical majority function an odd number of elementary codes generated from code generators and including pseudo random binary sequences including different numbers of bits, transmitting the modulated signal, receiving the transmitted signal, phase demodulating the received signal by means of a O-pi demodulator controlled by the same code as used in the transmitter to produce an output signal which is the output signal of said process and a duplicate of said input signal, generating in the receiver the code to control the demodulator from the same elementary codes as used in the transmitter, and synchronizing the code used in the receiver with that used for transmission by correlating each of the elementary codes with the received signal.

2. A process according to claim 1, in which the number of bits in each of the elementary codes are coprime.

3. A process according to claim 1, in which the correlations of each of the elementary codes with the received signal are carried out serially.

4. A process according to claim 1, in which the correlations of each of the elementary codes with the received signal are carried out in parallel.

5. Apparatus for coding and decoding an input signal for spread spectrum transmission in a communications system including a transmitter and at least one receiver, the transmitter including a O-pi phase modulator for receiving said input signal to be transmitted and producing a coded signal, a first code generator for generating a code which is a sequence of binary values, and control means for applying said code to said phase modulator, each receiver including a O-pi phase demodulator for decoding the received coded signal, a second code generator, each of said first and second code generators including an odd plurality of elementary code generators each having an output and each adapted to generate an elementary code formed of a pseudo random binary sequence containing a respective different number of bits, a control circuit for each elementary generator, and a combining circuit connected to said outputs of said elementary generators and delivering said code which is formed by applying a logical majority function to the input bits of the elementary codes each receiver further including means for applying the code generated by said second code generator to control said phase demodulator to produce an output which is the output of said system and a duplicate of said input signal, and correlation means having a first input for receiving said received coded signal and a second input for receiving each of the elementary codes generated by said elementary generators of said second code generator, and outputting a signal at the correlation peak of the inputs, said control circuit of said elementary generators of said second code generator including synchronization means acting in response to said output signal provided by said correlation means for synchronizing each of said elementary generators independently of the others.

6. Apparatus according to claim 5, in which said correlation means includes a single correlator circuit and commutation means disposed between the elementary code generators of the second code generator and said second input and which are controlled by signals provided by said control circuit.

7. Apparatus according to claim 5, in which the correlation means includes a plurality of correlator circuits equal in number to the number of said elementary code generators and each having a respective first input for receiving said received coded signal and a respective second input for receiving a particular elementary code.

* * * * *